(12) United States Patent
Hubberstey et al.

(10) Patent No.: US 8,646,346 B2
(45) Date of Patent: Feb. 11, 2014

(54) SKEW DETECTION

(75) Inventors: Mark Hubberstey, Wolverhampton (GB); Paul Smith, Telford (GB); Mark Whatley, Gosport (GB)

(73) Assignee: Goodrich Actuation Systems Limited (GB)

( * ) Notice: Subject to any disclaimer, the term of this patent is extended or adjusted under 35 U.S.C. 154(b) by 457 days.

(21) Appl. No.: 12/946,323

(22) Filed: Nov. 15, 2010

(65) Prior Publication Data

US 2011/0290044 A1 Dec. 1, 2011

(30) Foreign Application Priority Data

Nov. 16, 2009 (GB) .................................. 0919988.6

(51) Int. Cl.
*G01N 19/00* (2006.01)
(52) U.S. Cl.
USPC ........................................ 73/865.9; 244/194

(58) Field of Classification Search
USPC ........................................................ 73/865.9
See application file for complete search history.

(56) References Cited

U.S. PATENT DOCUMENTS

| | | | | |
|---|---|---|---|---|
| 5,680,124 A | * | 10/1997 | Bedell et al. | ............... 244/215 |
| 5,686,907 A | | 11/1997 | Bedell et al. | |
| 6,382,566 B1 | * | 5/2002 | Ferrel et al. | ............... 244/215 |
| 7,945,425 B2 | * | 5/2011 | Marx et al. | ............... 244/213 |

* cited by examiner

*Primary Examiner* — Hezron E Williams
*Assistant Examiner* — Nashmiya Fayyaz
(74) *Attorney, Agent, or Firm* — Cantor Colburn LLP

(57) ABSTRACT

A skew detection arrangement comprises first and second series of targets movable past respective sensors, and monitoring means operable to monitor the outputs of the sensors, wherein the monitoring means is operable upon sensing that an output of a first one of the sensors is in a transition state to determine, from a transition direction of the transition state and an output of the other of the sensors, whether a skew condition has arisen. A skew detection method is also disclosed.

14 Claims, 5 Drawing Sheets

SKEW DETECTION

This invention relates to the detection or sensing of a skew condition having arisen in an aircraft flight control surface.

An aircraft wing is typically provided with a number of slats, flaps or other movable flight control surfaces. Often, several of the flight control surfaces will be driven in unison, and the flight control surfaces provided on one of the wings of the aircraft may be arranged to move in synchronism with those of the other aircraft wing. As each of the flight control surfaces has a significant effect upon the aerodynamic performance of the wing, it is desirable to be able to sense the position or movement of each flight control surface so as to allow appropriate remedial action to be taken in the event of a jam or failure resulting in one or more of the flight control surfaces becoming skewed.

A number of skew sensing or detection arrangements are known. For example, U.S. Pat. No. 5,686,907 describes an arrangement in which a movable slat is provided with a pair of toothed racks which are used in driving the slat for movement. Each rack is provided with targets, and fixed sensors monitor the passage of the targets past the sensors as the slat is moved. The outputs of the sensors are compared with expected outputs. The actual sensor outputs and the expected outputs are the same during normal operation, and a difference therein is used to provide an indication that the slat has become skewed or lost. In the arrangement described in U.S. Pat. No. 5,686,907, the expected outputs are derived from the output of a position sensor monitoring the operation of the drive arrangement used to drive the slat for movement.

It is an object of the invention to provide a skew detection arrangement of simple and convenient form.

According to the invention there is provided a skew detection arrangement comprising first and second series of targets movable past respective sensors, and monitoring means operable to monitor the outputs of the sensors, wherein the monitoring means is operable upon sensing that an output of a first one of the sensors is in a transition state to determine, from a transition direction of the transition state and an output of the other of the sensors, whether a skew condition has arisen.

It will be appreciated that such an arrangement permits sensing of a skew condition in a relatively simple and convenient manner.

Preferably, the transition direction is used to determine an expected output of the other sensor. The monitoring means conveniently compares the actual output of the said other sensor with the expected output thereof to determine whether or not a skew condition has arisen.

In normal operation, the expected and actual outputs will match, and a difference therebetween can be used to provide an indication that a skew condition has arisen and/or take appropriate action to ensure that control of the aircraft is maintained.

The invention also relates to a method of detecting the occurrence of a skew condition using such a technique.

The targets are preferably mounted upon or are otherwise associated with respective drive racks whereby a slat or other aircraft flight control surface is driven for movement. Conveniently each drive rack is provided with two series of targets and associated sensors.

The invention will further be described, by way of example, with reference to the accompanying drawings, in which.

Figure 1:
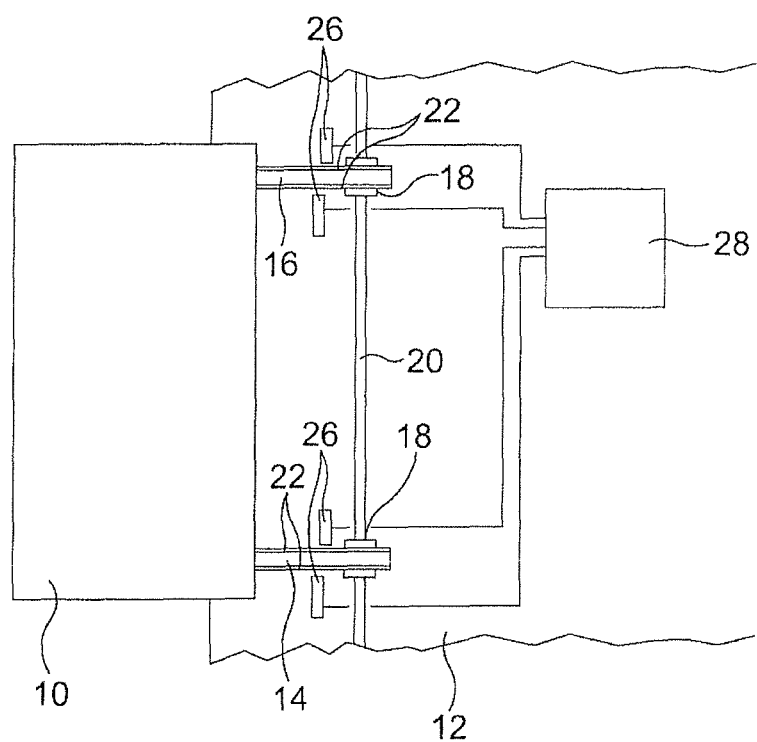
FIG. 1 is a diagrammatic view illustrating a skew detection arrangement in accordance with an embodiment of the invention, in use.

Referring firstly to FIGS. 1 to 4 there is illustrated an arrangement for use in driving a slat 10 or other aircraft flight control surface for movement relative to the remainder of an aircraft wing 12 and for sensing the occurrence of a skew condition in the slat 10. The slat 10 is provided with a pair of drive racks 14, 16 which are supported for translational movement relative to the wing 12 to allow the slat 10 to be driven for movement along an arcuate path between extended and retracted positions. Each rack 14, 16 is provided with teeth which mesh with the teeth of a pair of drive pinion gears 18 mounted upon a drive shaft 20. It will be appreciated that rotation of the drive shaft 20 drives the slat 10 for movement.

Each side face of each rack 14, 16 is provided with a target strip 22 defining a series of targets 24. Adjacent each target strip 22 is located a respective proximity sensor 26, each sensor 26 being sensitive to the passage of the associated targets 24 past the sensor 26 as the slat 10 is moved between its retracted and extended positions.

The sensors 26 may take a range of forms. For example, they could comprise Hall-effect sensors, but other possibilities include optical, capacitive or inductive sensors.

Figure 2:
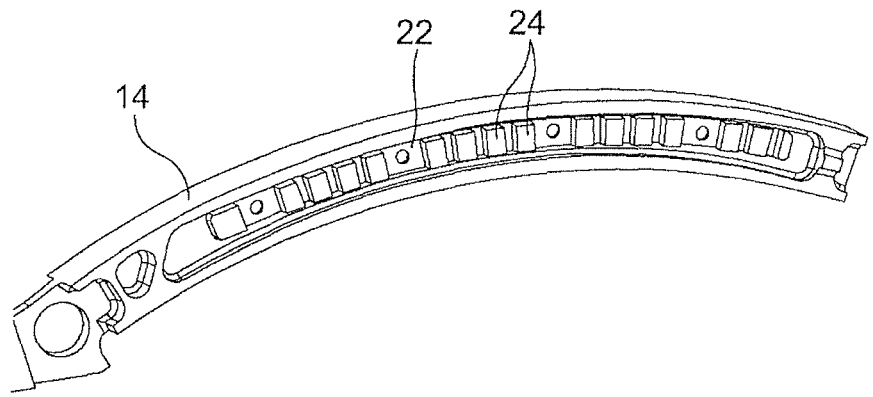
FIGS. 2 and 3 illustrate parts of the arrangement of FIG. 1.
Figure 3:
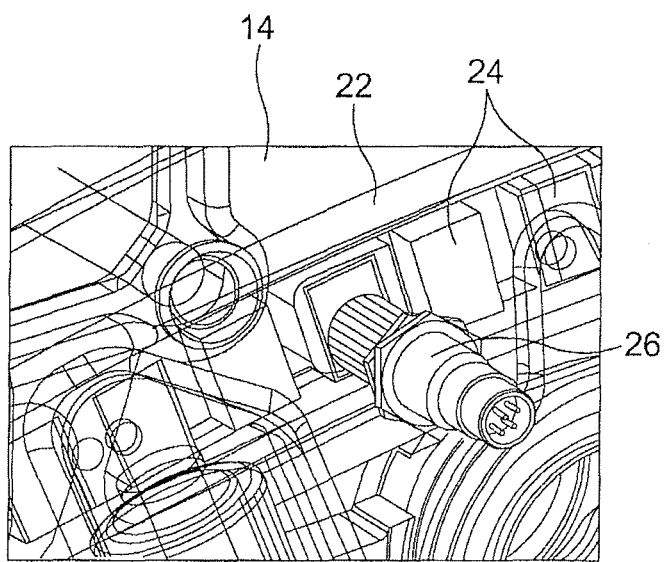
Figure 6:
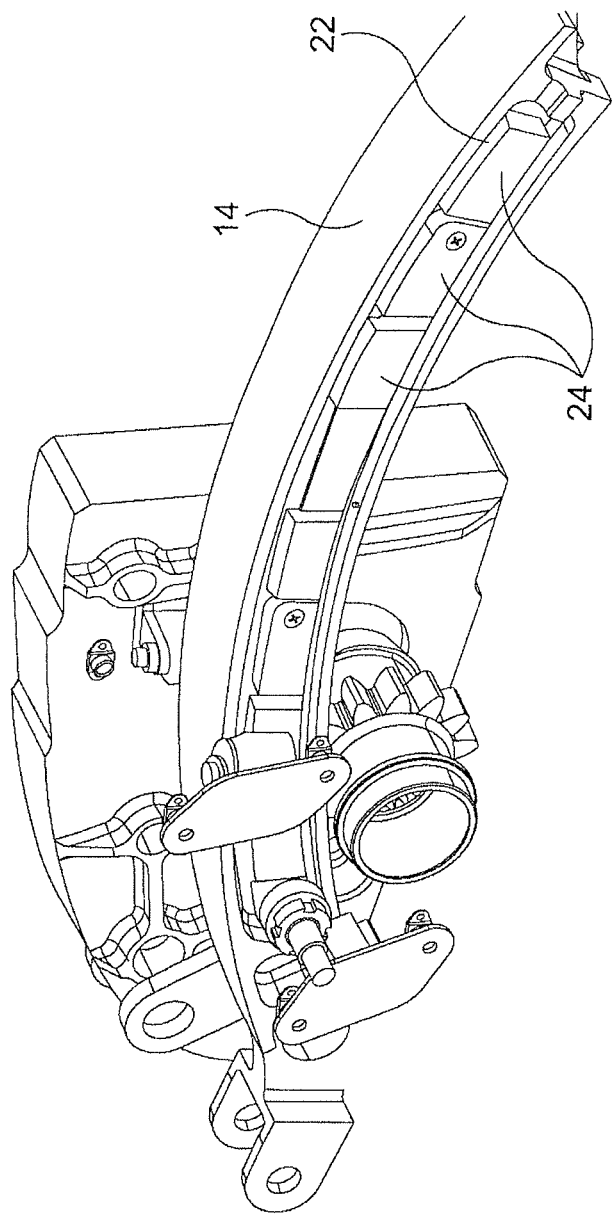
FIG. 6 illustrates part of an alternative arrangement.

As shown in FIG. 2, the targets 24 appear to be irregularly spaced. However, the bolts (not shown) used to secure the target strips 22 to the racks 14, 16 are used to form additional targets with the result that the targets 24 are equally spaced along the target strip 22, in use. Alternatively, a full strip of substantially equally spaced targets 24 may be provided on the target strip 22, as illustrated in FIG. 6, thereby avoiding the use of the bolts as targets.

In the arrangement illustrated, the targets 24 provided on each side face of the associated rack 14, 16 are aligned with one another, and the sensors 26 associated with each rack 14, 16 are slightly misaligned relative to one another, being offset by a distance approximately equal to half of the width of one of the targets 24. It will thus be appreciated that the outputs of the sensors 26 will not always be identical to one another as there will be occasions where some of the sensors 26 have targets 24 located adjacent thereto and others of the sensors 26 are adjacent the spaces between the targets 24. Alternatively, the sensors 26 may be aligned with one another, and the targets 24 slightly misaligned to achieve substantially the same effect.

Figure 5:
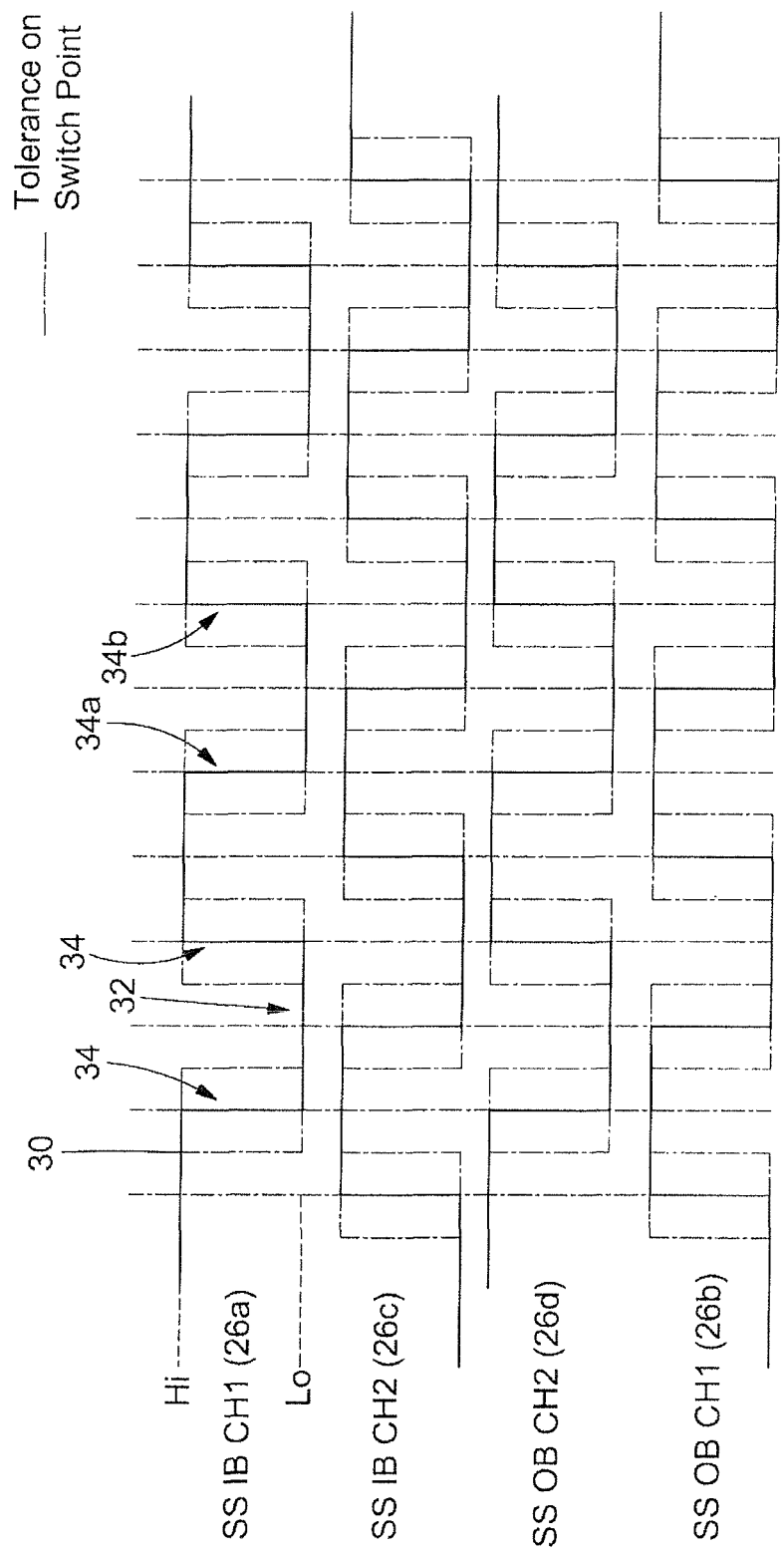
FIG. 5 is a diagram illustrating operation of the arrangement.

The skew detection arrangement further comprises monitoring means 28 operable to monitor the outputs of the sensors 26. The output of each sensor 26 is high when a target 24 is adjacent that sensor 26 and is low as a space between two targets 24 is located adjacent the sensor 26. It will be appreciated that as the racks 14, 16 move to drive the slat 10 between its retracted and extended positions, the output of each sensor 26, as shown in FIG. 5, will take substantially the form of a square wave including regions 30 in which the output of the sensor 26 is high, regions 32 in which the output of the sensor 26 is low, and transition regions 34 in which the output of the sensor 26 is changing between its high and low output states. It will be appreciated that the transition regions 34 are made up of falling transitions regions 34a in which the sensor output is decreasing from high to low, and rising transition regions 34b in which the sensor output is increasing from low to high.

In use, the output of one of the sensors 26 associated with the rack 14 is used in conjunction with the output of one of the sensors 26 associated with the rack 16 to provide a first channel to sense the occurrence of a skew condition. The output of the other sensor 26 associated with the rack 14 is used in conjunction with the output of the other sensor 26 associated with the rack 16 to form a second sensing channel. It will be appreciated that in this manner a degree of redundancy is provided within the system to ensure that the occurrence of a skew condition can still be detected in the event of the failure of, for example, one of the sensors 26. It also permits the resolution of the system to be enhanced, thereby permitting the rapid detection of skew conditions.

Figure 4:
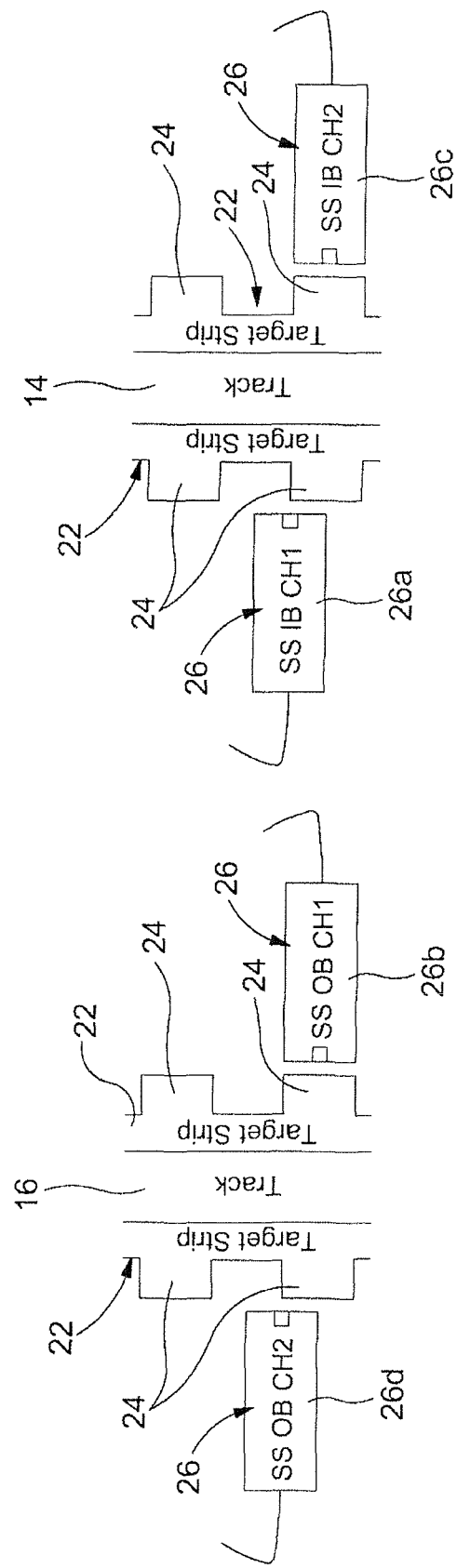
FIG. 4 is a schematic representation of the arrangement of FIG. 1.

In the arrangement illustrated, and with reference to FIGS. 4 and 5, the output of the inboard channel 1 sensor 26a is used in conjunction with the output of the outboard channel 1 sensor 26b. Similarly, the output of the inboard channel 2 sensor 26c is used in conjunction with that of the outboard channel 2 sensor 26d. As mentioned above, it will be appreciated that the two channels provide a degree of redundancy so as to allow the skew detection arrangement to function even in the event of, for example, the failure of one of the sensors. The two channels operate in substantially the same manner and so only the first channel will be described hereinafter in detail.

In use, during movement in the extend direction, the monitoring means 28 operates to monitor the outputs of the sensors 26a and 26b. Upon sensing that the output of one of the sensors 26a, 26b is in a transition state 34 (see FIG. 5), the monitoring means 28 determines whether the transition state 34 is a rising transition state 34b or a falling transition state 34a. The nature of the transition state 34 is used to determine whether the output of the other sensor 26a, 26b is expected to be high or low. For example, if a rising transition state 34b is sensed by the sensor 26b, then the expected state of the sensor 26a at that time will be high. If a falling transition state 34a is experienced at the sensor 26b, then the expected output of the sensor 26a will be low. The expected outputs of the sensor 26b upon sensing the presence of a transition state 34 at the sensor 26a are the reverse, thus a falling transition state 34a sensed at the sensor 26a is indicative that the expected output of the sensor 26b should be high, and a rising transition state 34b at the sensor 26a is indicative that the expected output of the sensor 26b should be low. It will be appreciated that the operation will be similar in the retraction direction, but with relationship between the directions of the encountered transition states and the expected sensor outputs being modified accordingly.

In FIG. 5, the solid lines illustrate the sensor outputs with the sensors 26 and targets 24 ideally positioned so that the transition states 34 occur when the outputs of the sensors are aligned with the mid-points of the associated targets 24 or spaces therebetween. The broken lines show the maximum acceptable tolerances for each sensor output which still result in a functioning system.

Thus, once a transition state has been sensed at either of the sensors 26a, 26b and the corresponding expected output of the other of the sensors 26a, 26b has been determined, the actual output of the said other of the sensors 26a, 26b is compared with the expected output. Provided the said actual output and expected output match with one another, then the monitoring means 28 will conclude that the slat is moving or operating normally and that no skew condition has arisen.

If a skew condition has arisen, then the degree of extension of the rack 14 will differ from that of the rack 16 with the result that the outputs of the sensors 26a, 26b will not be as illustrated in FIG. 5. Consequently, if a transition state is sensed at one of the sensors 26a, 26b and used to determine the expected output of the other of these sensors 26a, 26b, the actual output of that other sensor 26a, 26b will not match the expected output and this difference can be used to flag that a skew condition has arisen. Upon sensing that a skew condition has arisen, appropriate warnings or alarms may be output to warn the pilot of the presence of the skew condition. Alternatively, or additionally, adjustments may be made automatically to ensure that control of the aircraft can be maintained.

It will be appreciated that the skew detection arrangement will only trigger an indication that a skew condition has arisen after a predetermined level of skewing movement of the slat 10 has occurred. Consequently, the risk of false failure indications is low. Further, the tolerances are such that installation and calibration of the system is relatively simple.

It will be appreciated that a wide range of modifications and alterations may be made to the arrangement described hereinbefore without departing from the scope of the invention.

Although the invention is described in relation to a single slat 10, in practice each wing of the aircraft will typically have several slats associated therewith and similar skew detection arrangements may be associated with each said slat. Further, the invention may be applied to other movable flight control surfaces, not just to the aforementioned slats.

The invention claimed is:

1. A skew detection arrangement for sensing a skew condition having arisen in an aircraft flight control surface, the skew detection arrangement comprising:
    first and second series of targets movable past first and second sensors, and
    monitoring means operable to monitor outputs of the sensors,
    wherein the monitoring means is operable upon sensing that an output of the first one of the sensors is in a transition state, a transition state being a state in which the sensor output is changing between low and high output states and determining that an expected output of the second sensor is high when the sensor output is changing from a low output state to a high output state and low when the sensor output is chancing from the high output state to the low output state, to determine, from a transition direction of the transition state and an actual output of the second sensor, whether a skew condition has arisen in the aircraft flight control device.

2. A detection arrangement according to claim 1, wherein the transition direction is used to determine the expected output of the second sensor.

3. A detection arrangement according to claim 2, wherein the monitoring means compares the actual output of the said second sensor with the expected output thereof to determine whether or not a skew condition has arisen.

4. A detection arrangement according to claim 3, wherein in normal operation, the expected and actual outputs will match, and a difference therebetween is used to provide an indication that a skew condition has arisen.

5. A detection arrangement according to claim 4, wherein the targets are mounted upon or are otherwise associated with respective drive racks whereby a slat or other aircraft flight control surface is driven for movement.

6. A detection arrangement according to claim 5, wherein each drive rack is provided with two series of targets and associated sensors.

7. A detection arrangement according to claim 1, wherein the targets of the first series are offset relative to the targets of the second series.

8. A detection arrangement according to claim 7, wherein the targets of the first and second series are offset by a distance of approximately half of the width of one of the targets.

9. A detection arrangement according to claim 1, wherein the sensor associated with the first series of targets is offset from the sensor associated with the second series of targets.

10. A detection arrangement according to claim 9, wherein the sensor associated with the targets of the first series is offset from that associated with the second series of targets by a distance of approximately half of the width of one of the targets.

11. A method of detecting the occurrence of a skew condition in an aircraft flight control surface, the method comprising;
   providing first and second series of targets movable past first and second sensors;
   monitoring outputs of the sensors to sense whether an output of the first one of the sensors is in a transition state in which the sensor output is changing between low and high output states;
   determining that an expected output of the second sensor is high when the sensor output is chancing from a low output state to a high output state and low when the sensor output is chancing from the high output state to the low output state; and
   determining, from a transition direction of the transition state and an actual output of the second sensor, whether a skew condition has arisen in the aircraft flight control device.

12. A method according to claim 11, wherein the transition direction is used to determine the expected output of the second sensor.

13. A method according to claim 12, wherein the actual output of the said second sensor is compared with the expected output thereof to determine whether or not a skew condition has arisen.

14. A method according to claim 13, wherein in normal operation, the expected and actual outputs will match, and a difference therebetween is used to provide an indication that a skew condition has arisen.

* * * * *